United States Patent [19]

Helminiak et al.

[11] 4,051,108

[45] Sept. 27, 1977

[54] PREPARATION OF FILMS AND COATINGS OF PARA ORDERED AROMATIC HETEROCYCLIC POLYMERS

[75] Inventors: Thaddeus E. Helminiak, Dayton; Fred E. Arnold, Centerville, both of Ohio

[73] Assignee: The United States of America as represented by the Secretary of the Air Force, Washington, D.C.

[21] Appl. No.: 638,211

[22] Filed: Dec. 5, 1975

[51] Int. Cl.$^2$ .................. C08G 73/10; C08G 73/18; C08G 73/22
[52] U.S. Cl. .................. 260/47 CP; 260/47 R; 260/78 TF; 260/78.41; 260/79; 427/353; 428/426; 428/435; 428/457; 428/458
[58] Field of Search .................. 427/353; 260/78 TF, 260/47 CP, 78.41, 47 R, 79; 428/426, 435, 457, 458

[56] References Cited

U.S. PATENT DOCUMENTS 3,632,414 1/1972 Arnold et al. .................. 427/353

Primary Examiner—Lester L. Lee
Attorney, Agent, or Firm—Joseph E. Rusz; Cedric H. Kuhn

[57] ABSTRACT

Films and coatings are prepared from a dispersion of microscopic sheets of para ordered aromatic heterocyclic polymers by collecting the sheets from the dispersion either by filtration on a porous surface or by drawing a metal surface through the dispersion, and allowing the dispersion medium to evaporate. Upon drying the microscopic sheets coalesce to form the films or coatings. This procedure makes possible the fabrication of high quality, thermally stable films and coatings without the use of high temperature cures or other severe conditions.

10 Claims, No Drawings

PREPARATION OF FILMS AND COATINGS OF PARA ORDERED AROMATIC HETEROCYCLIC POLYMERS

RIGHTS OF THE GOVERNMENT

The invention described herein may be manufactured and used by or for the Government of the United States for all governmental purposes without the payment of any royalty.

FIELD OF THE INVENTION

This invention relates to a method for the preparation of composite films and coatings from para ordered aromatic heterocyclic polymers. In one aspect it relates to composite films and coatings prepared from para ordered aromatic heterocyclic polymers.

BACKGROUND OF THE INVENTION

In U.S. Pat. No. 3,632,414, issued to one of us as a coinventor, there is disclosed a method of preparing films and coatings of aromatic heterocyclic ladder polymers. As described in the patent, the method involves the steps of forming a fine dispersion of the ladder polymers in a non-solvent, collecting the particles from the dispersion either by filtration on a porous surface or by drawing a metal through the dispersion, and allowing the dispersion medium to evaporate. At column 2, line 10 et seq., it is stated that this technique is not sucessfull for non-ladder polymers and even for some partial or semi-ladder polymers. In other words, according to the patentees, the above-described method for preparing films and coatings is peculiar to ladder polymers, i.e., polymers possessing a complete double-strand structure.

It is an object of this invention, therefore, to provide polymers other than ladder polymers which can be utilized to prepare high quality, high temperature resistant films and coatings.

Another object of the invention is to provide a method for preparing composite films and coatings from para ordered aromatic heterocyclic polymers.

A further object of the invention is to provide composites of para ordered aromatic heterocyclic polymers.

Other objects and advantages of the invention will become apparent to those skilled in the art upon consideration of the accompanying disclosure.

SUMMARY OF THE INVENTION

The present invention resides in the discovery that para ordered aromatic heterocyclic polymers can, contrary to the teaching of the prior art, be utilized in the production of films by forming a dispersion of microscopic sheets of a para ordered aromatic heterocyclic polymer in a non-solvent; collecting or depositing the microscopic sheets on a surface, e.g., by filtration on a porous surface or by drawing a metal surface through the dispersion, and evaporating the non-solvent. The microscopic sheets so deposited coalesce upon evaporation of the solvent, leaving a high quality, thermally stable film or coating.

In one embodiment, the present invention resides in a composite film comprising microscopic sheets of a para ordered aromatic heterocyclic polymer, the sheets being coalesced to one another to form the film. As the name implies, the microscopic sheets are two-dimensional usually measuring about 50 to 150 microns across.

Any para ordered aromatic heterocyclic polymer can be used in preparing the composite films. Examples of such polymers, which are described in the literature, include those having the following formula:

where Z is a heterocyclic selected from the group consisting of

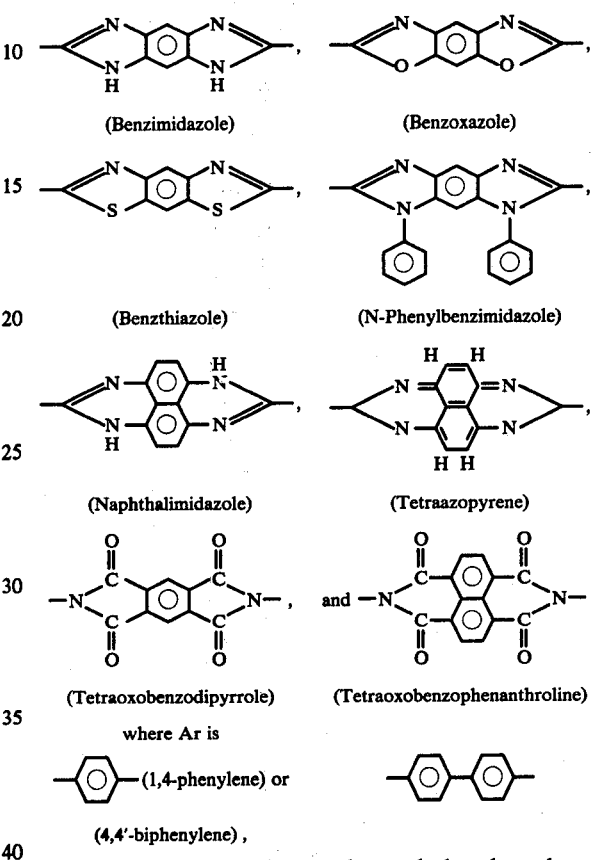

where Ar is

—⟨O⟩—(1,4-phenylene) or —⟨O⟩—⟨O⟩— (4,4'-biphenylene), and $n$ is an integer having a value such that the polymer has an intrinsic viscosity of at least 2, preferably 5 to 15, inclusive.

As mentioned above, it was previously thought that only a two-strand, ladder polymer could be used to prepare films by the method described herein. It was completely unexpected, therefore, when it was found that a single strand polymer can be utilized to fabricate composite films having outstanding physical properties. However, it was also found to be critical that the single strand polymer be a para ordered aromatic heterocyclic polymer as described herein-above. Thus, aromatic heterocyclic polymers which are not para ordered, e.g., those which are meta ordered or contain kinks in their polymer molecule, are unsuitable for use in preparing composite films.

In preparing the polymer dispersion used in the present method, the para ordered aromatic heterocyclic polymer is initially dissolved in a solvent for the polymer, such as methanesulfonic acid. The solution so obtained is then added to a non-solvent for the polymer, thereby causing the polymer to precipitate as particles in the form of two-dimensional, microscopic sheets. The polymer particles are collected by filtration while washing with the non-solvent until they are free of acid. During the filtration and washing, the particles are maintained in a wet condition with the non-solvent in order to prevent agglomeration. Thereafter, the particles, wetted in non-solvent, are added to the non-solvent so as to obtain a polymer dispersion of a desired concentration. The dispersion usually contains about 0.1 to 5.0 grams of polymer per 100 milliliters of the dispersion medium (non-solvent).

In preparing a composite film, the polymer dispersion is filtered through a porous surface, such as a fritted glass filter. Upon evaporation of occluded non-solvent, the filtered particles coalesce, forming a film having excellent physical properties. By varying the polymer concentration and the amount of the dispersion, a composite film having a controlled thickness can be fabricated. Thus, it is within the purview of this invention to fabricate composite films which can be used as structural members in aircraft and aerospace vehicles. An important advantage is derived from this application since it renders unnecessary the use of reinforcing fibers conventionally used in fabricating composites and greatly simplifies the entire procedure of composite fabrication.

Coatings of the para ordered aromatic heterocyclic polymer can be readily applied to a surface of a body by merely dipping or placing the surface in a polymer dispersion. After removal of the surface, the dispersion medium is allowed to evaporate, leaving a coating which strongly adheres to the surface. While the coating procedure can be conducted at room temperature, evaporation of the non-solvent can be accelerated by placing the body in a forced air oven. It is within the contemplation of the invention to repeat this procedure one or more times in order to increase the thickness of the polymer coating.

As a non-solvent and dispersion medium, it is generally preferred to employ an alcohol or a hydrocarbon that is relatively volatile. Since one of the advantages of the present method is that it can be conducted at room temperature without using high temperature conditions required in casting films, the non-solvent is preferably one having a boiling point of about 100° C or lower. Examples of non-solvents that can be used include methanol, ethanol, propanol, isopropanol, butanol, hexane, heptane, octane, benzene and the like.

In addition to possessing good physical properties, the films and coatings prepared by the present method are stable in high temperature environments. These properties render them particularly useful in aerospace applications, e.g., the protection of materials against exposure to heat. Also, as discussed hereinabove, the method can be used to fabricate composites of para ordered aromatic heterocyclic polymers.

A more complete understanding of the invention can be obtained by referring to the following illustrative examples which are not intended however to be unduly limitative of the invention.

EXAMPLE I

Preparation of PDIAB Polymer:

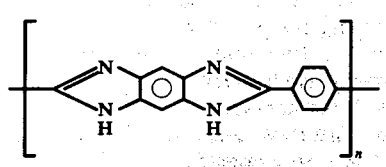

Poly[(1,7-dihydrobenzo]1,2-d:4,5-d'[diimidazole-2,6-diyl)-1,4-phenylene]

To 100 g of deoxygenated polyphosphoric acid were added 1.15 g (0.0256 mole) of 1,3-diamino-4,6-(p-toluenesulfamido)benzene and 0.4279 g (0.00256 mole) of terephthalic acid. The mixture was slowly heated (4° C/min) to 90° C and maintained at that temperature for 16 hours. The temperature was then increased at the same rate to 190° C and maintained at that temperature for 6 hours. The resulting viscous solution was poured out of the flask at 190° into a beaker and allowed to cool to room temperaure. The polymer was precipitated in methanol, using a blender to facilitate mixing. The fibrous yellow material was washed twice with 1-liter portions of anhydrous methanol and dried at 200° C under reduced pressure (0.4 mm Hg). Precipitation from 500 g of methanesulfonic acid and drying in the above manner gave 0.8 g (93%) of polymer. An intrinsic viscosity of 4.9 dl/g in 100% methanesulfonic acid was determined.

Analysis: Calc'd for $(C_{14}H_8N_4)_n$: C, 72.41; H,3,45; H,24.14 Found: C,72.23; H,3.56; N,23,48.

EXAMPLE II

Preparation of PBO polymer:

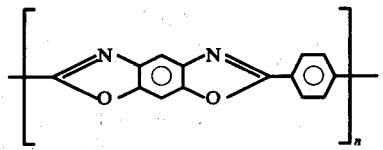

Poly[1,7-dihydrobenzo[1,2-d:4,5-d']dioxazole-2,6-diyl)-1,4-phenylene]

To 300 g of deoxygenated polyphosphoric acid were added 3.38 g (0.0158 mole) of 4,6-dihydroxy-m-phenylene diamine dihydrochloride and 2.63 g (0.0158 mole) of terephthalic acid. The mixture was slowly heated (4° C/min) to 60° C and maintained at that temperaure for 10 hours. The temperature was then increased at the same rate to 190° C and maintained at that temperature for 8 hours The resulting viscous solution was poured out of the flask at 190° C into a beaker and allowed to cool to room temperature. The polymer was precipitated in methanol, using a blender to facilitate mixing. The material was washed twice with 1-liter portions of methanol and dried at 200° C under reduced pressure (0.4 mm Hg). Precipitation from 500 g of methanesulfonic acid and drying in the above manner gave 3.7 g (99%) of polymer. An intrinsic viscosity of 3.8 dl/g in 100% methanesulfonic acid was determined.

Analysis: Calc'd for $(C_{14}H_6N_2O_2)_n$: C,71.79; H,2.57; N,11.96 Found: C,70.53; H,2.98; N,11.01

EXAMPLE III

To runs were carried out in which films were fabricated from the para ordered aromatic heterocyclic polymers prepared in Examples I and II.

Initially polymer dispersions were prepared of the polymers (PDIAB and PBO). In each run 1 g of polymer was added to 100% methanesulfonic acid. The resulting solution was then slowly added to 1000 ml of methanol to precipitate the polymer in the form of sheet-like particles. The particles were separated from solution by filtering through a medium porosity fritt and washing with excess methanol until they were free of acid. The particles were kept wet with methanol at all times during the filtering and washing operations. The particles were washed into a container and stored at concentrations between 0.1 to 1.0 percent solids. The percent solids was varied according to the specific application used.

Dispersions containing 0.15 g of PDIAB and PBO in 100 ml of methanol (0.13% solids) were each filtered through a medium porosity fritt (3.25 inches diameter). On drying the filtered particles in each run coalesced to form tough durable films. Properties of the films are shown below in the table.

TABLE

|  | PDIAB Film | PBO Film |
| --- | --- | --- |
| Thickness, mil | 1 | 1 |
| Tensile Strength, lbs/m$^2$ | 8,500 | 20,734 |
| Elongation at rupture, % | 2.4 | 2.7 |
| Initial Modulus, lbs/m$^2$ | 500,000 | 424,000 |

EXAMPLE IV

Runs were conducted in which 1 square inch pieces of titanium alloy (Ti-8Al-1V-1Mo) were placed in 5% polymer dispersions prepared as described in Example III. On removal the metal pieces were covered with a light yellow dispersion. The dispersion medium was removed by room temperature evaporation or by placing pieces in a forced air oven. After removal of the non-solvent, the pieces had a yellow coating which adhered tenaciously to the metal surfaces.

EXAMPLE V

Runs were carried out in which it was attempted to cast film of PBO and PDIAB in order to compare strengths with composite films prepared as described in Example III. However, satisfactory films could not be made. The cast films had severely wrinkled surfaces which precluded suitable samples for tensile testing.

EXAMPLE VI

A series of runs was conducted for the purpose of determining if single strand aromatic heterocyclic polymers which are not para ordered can be used to prepare films by the procedure followed in Example III. The polymers employed in the runs had the following structural formulas:

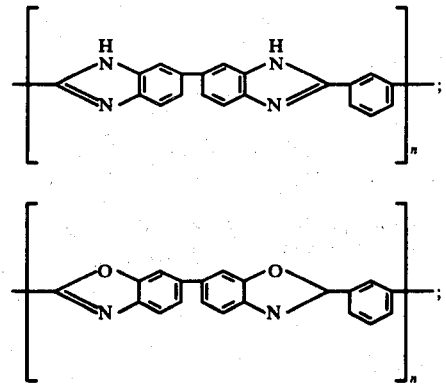

-continued

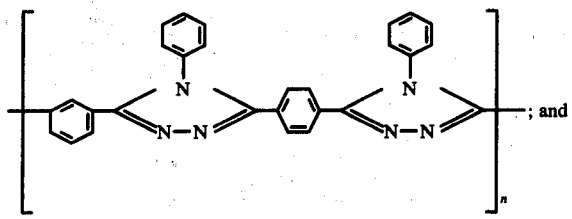

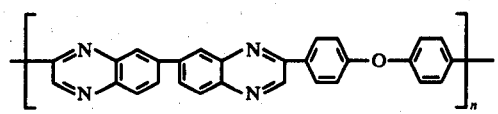

The polymers were precipitated from methanesulfonic acid at a concentration of 0.5 to 1 percent into anhydrous methanol. The materials did not precipitate in the form of two dimensional sheets as did the para ordered polymers. At lower concentrations the precipitates were in particulate or globular form and at higher concentrations in a form appearing to be fibrous in nature. None of the four polymers showed tendencies to form solid-phase films when the film-forming procedure described in Example III was followed.

From the data in the above examples, it is seen that composite films and coatings having outstanding physical properties can be prepared from para ordered aromatic heterocyclic polymers by the method disclosed herein. Moreover, the data show it to be critical that the polymers be para ordered, for the method cannot be used to fabricate films from other single strand polymers Furthermore, in view of the data indicating that satisfactory films cannot be cast with the para ordered polymers, it appears that the present method may provide the only feasible procedure for fabricating films from such polymers.

As will be evident to those skilled in the art, modifications and variations of the present invention can be made in view of the foregoing disclosure without departing from the spirit and scope of the invention.

We claim:

1. A method of fabricating a composite film consisting of a para ordered aromatic heterocyclic polymer having the following formula:

where Z is a heterocyclic selected from the group consisting of

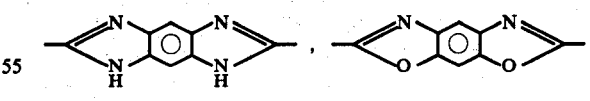

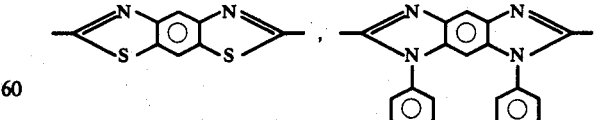

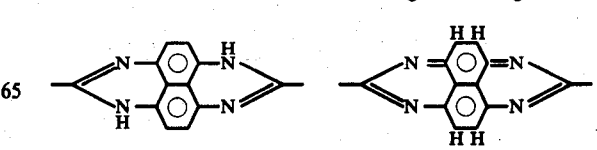

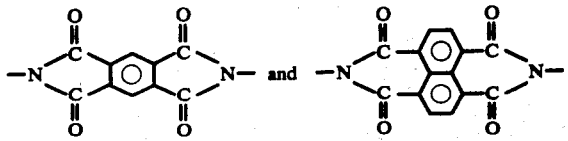

where Ar is

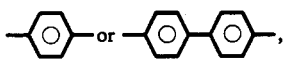

and n is an integer having a value such that the polymer has an inherent viscosity of at least 2, said method comprising the following steps:
a. mixing a solution consisting of the polymer in a solvent therefor wth a non-solvent for the polymer having a boiling point up to about 100° C and being selected from the group consisting of a hydrocarbon and an alcohol, the amount of non-solvent mixed with the solution being sufficient to precipitate the polymer from solution, thereby precipitating the polymer in the form of two dimensional, microscopic sheets;
b. separating the microscopic sheets from the resulting mixture while maintaining the sheets wetted with the non-solvent;
c. mixing the wetted microscopic sheets with the non-solvent so as to provide a dispersion containing about 0.1 to 5 grams of the sheets per 100 milliliters of non-solvent;
d. collecting from the dispersion at least one layer of the microscopic sheets; and
e. evaporating non-solvent from the sheets so that they coalesce and form a composite film.

2. The method according to claim 1 in which the non-solvent is selected from the group consisting of methanol, ethanol, propanol, isopropanol, butanol, hexane, heptane, octane and benzene.

3. The method according to claim 1 in which Z is

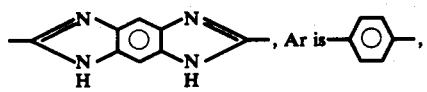

and n is an integer having a value such that the polymer has an inherent viscosity in the range of 5 to 15.

4. The method according to claim 1 in which Z is

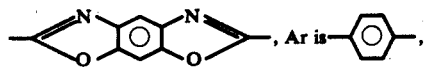

and n is an integer having a value such that the polymer has an inherent viscosity in the range of 5 to 15.

5. The method according to claim 1 in which Z is

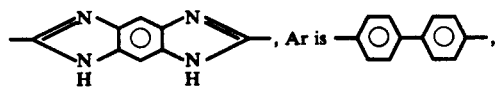

and n is an integer having a value such that the polymer has an inherent viscosity in the range of 5 to 15.

6. The method according to claim 1 in which Z is

and n is an integer having a value such that the polymer has an inherent viscosity in the range of 5 to 15.

7. The method according to claim 1 in which Z is

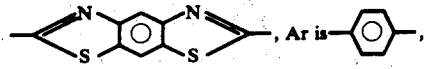

and n is an integer having a value such that the polymer has an inherent viscosity in the range of 5 to 15.

8. The method according to claim 1 in which at least one layer of the microscopic sheets is collected by filtration of the dispersion on a porous surface.

9. The method according to claim 1 in which at least one layer of the microscopic sheets is collected on a metal surface by contacting the metal surface with the dispersion.

10. As an article of manufacture, a composite film comprising at least one layer consisting of two dimensional, microscopic sheets of a para ordered aromatic heterocyclic polymer, the sheets being coalesced to one another to form the film, said polymer having the following formula:

where Z is a heterocyclic selected from the group consisting of

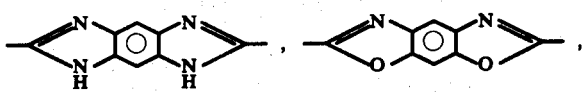

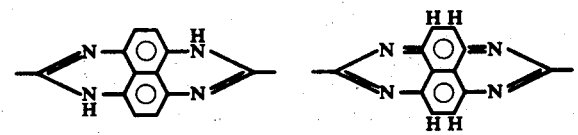

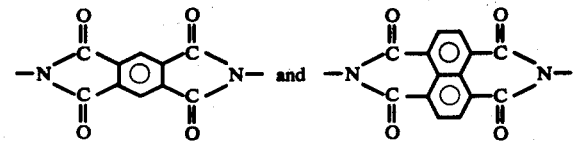

where Ar is

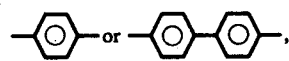

and n is an integer having a value such that the polymer has an inherent viscosity of at least 2.